United States Patent [19]
Peterson

[11] 3,946,932
[45] Mar. 30, 1976

[54] BRAZING GRAPHITE TO GRAPHITE
[75] Inventor: George R. Peterson, Andersonville, Tenn.
[73] Assignee: The United States of America as represented by the United States Energy Research and Development Administration, Washington, D.C.
[22] Filed: Apr. 25, 1968
[21] Appl. No.: 725,268

[52] U.S. Cl. ................. 228/121; 228/234; 228/263
[51] Int. Cl.² ........................................ B23K 31/02
[58] Field of Search ................ 29/470, 472.7, 487; 228/121, 234, 263

[56] References Cited
UNITED STATES PATENTS
2,095,807   10/1937   Gier, Jr. ........................... 29/487
2,979,813   4/1961   Steinberg ........................... 29/470
2,979,814   4/1961   Steinberg ........................... 428/408

FOREIGN PATENTS OR APPLICATIONS
1,379,684   10/1964   France ............................. 29/472.7

Primary Examiner—Benjamin R. Padgett
Assistant Examiner—B. H. Hunt
Attorney, Agent, or Firm—Dean E. Carlson; David S. Zachry; Earl L. Larcher

[57] ABSTRACT

Graphite is joined to graphite by employing both fine molybdenum powder as the brazing material and an annealing step that together produce a virtually metal-free joint exhibiting properties similar to those found in the parent graphite. Molybdenum powder is placed between the faying surfaces of two graphite parts and melted to form molybdenum carbide. The joint area is thereafter subjected to an annealing operation which diffuses the carbide away from the joint and into the graphite parts. Graphite dissolved by the dispersed molybdenum carbide precipitates into the joint area, replacing the molybdenum carbide to provide a joint of virtually graphite.

8 Claims, 1 Drawing Figure

U.S. Patent  March 30, 1976  3,946,932
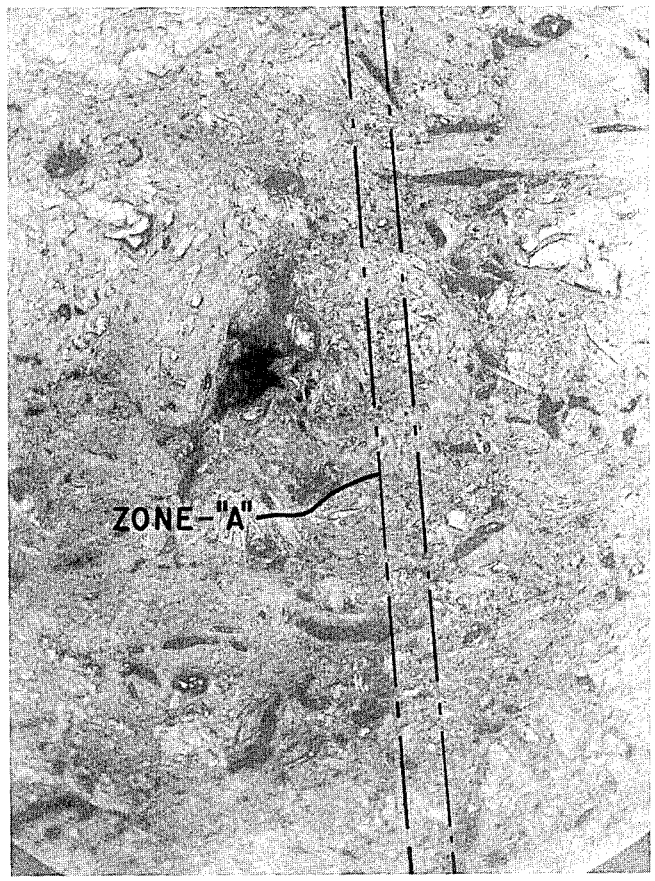
INVENTOR.
George R. Peterson
BY
ATTORNEY.

BRAZING GRAPHITE TO GRAPHITE

The present invention was made in the course of, or under, a contract with the U.S. Atomic Energy Commission.

The present invention relates generally to a method of providing graphite-to-graphite joints, and more particularly to the method of brazing graphite to graphite by employing molybdenum powder as the brazing material together with an annealing step for producing a joint consisting virtually of graphite.

Graphite possesses unique properties which render it particularly suitable as a structural material for use in high temperature applications in both nuclear and non-nuclear environments. For example, properties such as low thermal expansion with high thermal conductivity and high strength at elevated temperatures make graphite a desirable candidate for high temperature applications such as furnace linings, rocket nozzles, nuclear reactor components, etc. The employment of graphite in nuclear reactors for purposes such as fuel element fabrications is enhanced by the desirable nuclear moderating properties enjoyed by graphite.

While graphite possesses properties and characteristics which render it advantageous as a structural material, it also suffers a significant drawback or shortcoming which detracts from its usefulness as a structural material. This shortcoming or drawback is due to the fact that graphite has been found to be a difficult material to join together, and the techniques for joining graphite parts or structures as previously practiced have not produced graphite joints which exhibit satisfactory properties or characteristics. For example, a preferable joint between graphite structures enjoys flexural and tensile strengths closely approximating those of the graphite structures at low and high temperatures, and also porosity and machinability characteristics similar to those of the graphite being joined.

Extensive efforts have been previously conducted in order to provide brazing materials and methods for using such materials to produce joints between graphite parts that possess the aforementioned and other desirable properties. Of the various brazing materials, refractory metals and some rare earths have heretofore proven to be the most satisfactory. However, previous efforts with refractory metal brazing materials have not demonstrated that joints possessing the above desirable properties could be obtained. It is believed that the failure of the previous efforts with refractory metal brazing materials to provide the desirable joints is due to the particular form and type of refractory metal as well as the brazing method employed for effecting the joint.

The use of refractory metals for brazing graphite to graphite is amply illustrated in U.S. Pat. No. 2,979,813 issued to Morris A. Steinberg. In this patent it is shown that refractory metals such as elemental titanium, zirconium, hafnium, vanadium, niobium, tantalum, chromium, molybdenum, and tungsten can be used to join graphite structures. The brazing method employed in this patent for effecting the graphite-to-graphite joint comprises the placement of a refractory metal in either the form of a solid layer or as a layer of powder in a particle size range between 100 and 325 mesh intermediate faying surfaces of two graphite pieces. The joint area is heated to convert the refractory metal to a carbide of the latter and to decompose this carbide for permitting the volatilization thereof from the joint area and thereby providing a somewhat "metal-free" joint.

While the aforementioned patent related to the use of carbideforming refractory metals per se as being useable as graphite brazing materials, the above-mentioned patentee in U.S. Pat. No. 2,979,814 specifically pointed out that only certain of the carbide-forming elements described in his U.S. Pat. No. 2,979,813 could be used to provide a carbon joint free of foreign material. Apparently the basis for this qualification as to the use of certain brazing materials is due to finding that only those elements capable of forming meta-stable carbides which can be eliminated from the joint by decomposition and volatilization of the decomposition products can be successfully employed to provide metal-free carbon-to-carbon joints. To this end the patentee points out that the molybdenum cannot be satisfactorily used as a graphite brazing material since the molybdenum carbide formed in the joint area is extremely stable and does not exhibit a sufficient vapor pressure at elevated temperatures to permit its removal after the carbide has been decomposed at a temperature as high as 3000°C.

The present invention, on the other hand, relates to a method of brazing graphite to graphite by employing as the brazing material the very refractory metal, i.e., molybdenum, described in the prior art as being unsatisfactory for such purposes. In accordance with the method of the present invention a very thin layer of fine molybdenum powder disposed between faying surfaces of the graphite structures being joined is sequentially melted, converted to a carbide, and then subjected to an annealing step at a temperature above 2000°C. for a several-hour duration to effect diffusion of the molybdenum carbide away from the joint interface and into the graphite structures being joined. The joint obtained by practicing the present invention is virtually all graphite and enjoys properties and characteristics such as mentioned above that closely correspond to those of the parent graphite. The use of molybdenum as the brazing material is especially advantageous, not only because of the attainment of these desirable properties, but also due to the fact that the molybdenum brazed joints exhibit an increase in flexural strength with an increase in temperature, whereas the other refractory metal brazed joints suffered a marked decrease in flexural strength when subjected to elevated temperatures.

Accordingly, an object of the present invention is to provide a new and improved graphite-to-graphite joint which exhibits properties and characteristics closely corresponding to those of the parent graphite.

Another object of the present invention is to provide a new and improved method for braze-joining graphite to graphite by using molybdenum powder as the brazing material and employing an annealing step for effecting the diffusion of molybdenum carbide from and the precipitation of graphite into the joint area.

Other and further objects of the invention will be obvious upon an understanding of the illustrative embodiment about to be described, or will be indicated in the appended claims, and various advantages not referred to herein will occur to one skilled in the art upon employment of the invention in practice.

In the accompanying drawing:

The FIGURE is a photomicrograph (250X) of a graphite-to-graphite joint produced by the method of the present invention. As illustrated, the bond between the graphite members has been achieved in such a manner that neither is there a detectable joint nor any indication of a molybdenum-graphite interface present.

Generally, the method of the present invention contemplates brazing together graphite structures or members for the purpose of providing a joined structural component or assembly which exhibits properties and characteristics in the joint area that correspond to those possessed by the graphite structures being joined. In accordance with the present method, a pair of graphite structures are disposed in a contiguous relationship with the faying surfaces thereof in a substantially abutting or contacting relationship. Intermediate these faying surfaces and providing the actual contact between these surfaces is a very thin layer of fine molybdenum powder which is utilized as the brazing material. With the assembly disposed in an appropriate furnace a pressure loading is applied against opposite ends of the graphite members, forcing the faying surfaces towards one another. Under the influence of this pressure loading, the joint area is heated in an inert atmosphere to a temperature sufficient to melt the molybdenum and convert it to molybdenum carbide. After the molybdenum is in carbide form, the joint area is maintained under the influence of or subsequently subjected to a relatively high temperature, e.g., a temperature greater than 2000°C., for a prolonged duration for the purpose of annealing the joint area and thereby causing the molybdenum carbide to diffuse into the adjacent graphite surfaces. During dispersion of the molybdenum carbide from the joint area, excess graphite is dissolved by the molybdenum carbide which, upon cooling, precipitates into the joint area. This novel annealing step provides a joint consisting virtually entirely of graphite. As more clearly illustrated in the accompanying drawing, the joint is depicted by the Zone A area and, as is clearly evident, no joint or molybdenum carbide-graphite interface is present.

The graphite-to-graphite joint provided by the brazing method of the present invention enjoys properties and characteristics substantially more desirable than heretofore obtainable by employing molybdenum as the brazing material, or, for that matter, any other refractory metal. For example, the joint such as illustrated in the drawing is leak-tight in that it has a zero leak rate even after being subjected to hot gas testing at temperatures in the neighborhood of 2000°C.

In order to provide the novel molybdenum braze joints effected by the method of the present invention, it is critical that the molybdenum brazing material be in powder form and disposed between the graphite faying surfaces as a very thin layer. The powder is of a size less than 325 mesh (Tyler) and may be applied to the faying surface of one or both of the graphite structures in any suitable manner. For example, a tacky substance may be utilized on the graphite faying surface to hold the molybdenum powder in place. This tacky surface may be provided by a mixture of partially polymerized furfuryl alcohol and minus 5-micron graphite flour. This graphite and graphite forming mixture is applied to one of the graphite faying surfaces and any excess of the mixture is then wiped from the surface, leaving only a minimal quantity which will provide a molybdenum powder retaining surface. The molybdenum powder is applied to the prepared face or faying surface of the graphite structure by dipping the latter into a thin layer of the fine powders spread on a flat surface. The excess powders picked up from the surface may then be removed from the faying surface by lightly tapping the graphite structure. The resulting layer of molybdenum powder on the faying surface is of a thickness somewhat less than 1 mil (0.001 of an inch). In fact, the thickness of the powder layer is difficult to accurately measure and may be closer to less than 0.5 mil. Regardless of the technique used to introduce the molybdenum powder between the faying surfaces, it is critical that the layer be very thin, i.e., in the order of about 0.5 mil or less. The powder layer thickness is critical since deleterious brazing results may occur by using layers of greater thickness or in forms other than particulate. For example, a molybdenum foil or disk about 1 mil thick when subjected to the brazing method of the present invention leaves a detectable graphite-molybdenum joint line or interface which is not leak-tight or of sufficient strength to provide the desired properties enjoyed by the joints produced by practicing the present invention. Apparently the existence of this graphite-molybdenum interface is due to the fact that the excess quantity of molybdenum carbide in the joint area prevents the entire quantity of molybdenum carbide from diffusing completely out of the joint area during the annealing operation. While it may be possible that a very prolonged annealing operation would effect diffusion of the remaining molybdenum carbide from the joint area, such an operation is highly impractical.

In brazing with the molybdenum powder, an observed melting occurs prior to the conversion of the molybdenum to a carbide form. This melting of the powder causes a wetting of the graphite surface which enhances the brazing operation.

Inasmuch as the melting point of molybdenum is approximately 2600°C., the pressure loading on the graphite structures should be sufficient to bring the molybdenum melting temperature down to about 2500°C. For example, a pressure within the range of about 1135–2270 psi can be employed with the graphite structures without fear of overloading the structures or causing other deleterious effects on the structures. A moderate pressure of 1700 psi has been more or less arbitrarily selected as a satisfactory pressure to be used for holding the graphite structures in an abutting relationship. This pressure of 1700 psi increases slightly to about 1900 psi during a brazing operation due to the thermal expansion of the graphite, but drops again to about 1700 after the melting of the molybdenum powder takes place.

The influence of the brazing time on the molybdenum powder metal joints is not critical as long as complete melting of the molybdenum occurs before carbiding takes place, which is usually effected in about 5 to 10 seconds at 2500°C.

Annealing the molybdenum braze joints at temperatures in excess of 2000°C. after the molybdenum is converted to molybdenum carbide has a very significant effect upon the quality of the joint. As briefly mentioned above, and from observations of obtained metallographic data, the annealing step induces diffusion of the two molybdenum carbides (MoC and $Mo_2C$) into the abutting graphite faces. This diffusion of the molybdenum carbide is believed to be caused by the molybdenum carbides dissolving excess graphite in the joint area. Upon completion of the dissolution of the excess graphite and the dispersion of the molybdenum carbide into the adjacent graphite faces, the joint area is cooled to effect the precipitation of excess graphite into the joint area to replace the dispersed molybdenum carbide. The extent of dispersion of the molybdenum carbide into the graphite faces is not known, but from viewing data such as the joint area delineated by Zone A in the drawing it appears clear that the molybdenum carbide is highly dispersed and cannot be detected at a location near the joint. With the diffusion of the molybdenum carbide from the joint area and the replacement of the molybdenum carbide by the precipitated graphite, the resulting joint is composed virtually entirely of graphite and consequently exhibits essentially the same properties and characteristics as the graphite in the joined structures. The annealing temperatures are preferably maintained for sufficient duration to effect the desired dispersion or diffusion of the molybdenum carbide. For example, satisfactory results have been achieved by annealing a brazed joint at 2300°C. for a period of approximately 4 hours, or, if desired, a higher temperature of 2900°C. may be employed for approximately 30 minutes. The joints resulting from either of these annealing steps exhibit virtually the same properties.

In order to provide a better understanding of the present invention, an example of a typical graphite brazing operation is set forth below. This example is meant to be illustrative and is not intended to limit the scope of the present invention, which is defined by the appended claims.

EXAMPLE

A pair of graphite members approximately 2 inches in diameter are joined together by placing on one of the faying surfaces of the graphite members a layer of a mixture consisting of partially polymerized furfuryl alcohol and minus 5-micron graphite flour. This mixture is then wiped from the face, leaving only enough of the mixture to provide a slight "tackiness" which is adequate to carry and retain molybdenum powder. This prepared face is then dipped into a thin layer of −325 mesh molybdenum powder. The excess powder is removed from the face by slightly tapping the graphite member. The resulting layer of molybdenum powder is approximately 0.5 mil in thickness. The two graphite sections are then placed together and mounted in a brazing fixture consisting of a simple hydraulic jack assembly and a suitable heat source provided by an induction coil disposed about the joint area or brazing zone. The brazing fixture, or at least the joint area, is maintained in an inert environment provided by an atmosphere of argon gas during brazing operations. With the joint area in the inert atmosphere, a pressure loading corresponding to 1700 psi is applied against the graphite sections, forcing the faying surfaces towards one another. The joint is then heated for a duration of approximately 30 seconds, with about 20 seconds required to heat the molybdenum powder to the brazing temperature of 2500°C. and about 5–10 seconds for melting the molybdenum and effecting the conversion of the molybdenum to molybdenum carbide. During this heating cycle a pressure increase is experienced in the joint area due to the thermal expansion of the graphite. However, at the end of about 20 to 25 seconds of the 30-second heating time a slight decrease in this pressure takes place due to the melting of the molybdenum. After the 30-second time period the joint area is maintained at a temperature of 2300°C. by the induction coil for a period of 4 hours. This latter heating effects annealing of the joint to bring about the diffusion of the molybdenum carbide into the graphite surfaces adjacent the joint and to effect the dissolution of excess graphite contacted by the molybdenum carbide. At the end of this annealing period the joint is cooled for effecting precipitation of graphite into the joint for replacing the molybdenum carbide.

It will be seen that the joints provided between graphite structures by practicing the teachings of the present invention set forth novel properties and characteristics heretofore unobtainable in the graphite brazing art. For example, as pointed out above, the molybdenum braze joints are consistently leak-tight and have a zero leak rate at high temperatures even when exposed to hot gases. The thermal shock stability of the joint is also highly satisfactory in that in the thermal cycling of molybdenum brazed joints such as caused by rapid heating (less than 30 seconds) to a temperature of 2800°–2900°C. and rapid cooling there has been no evidence of any joint failure or degradation due to these extreme thermal shocks. Another important aspect of the present invention is in the use of coatings on top of the joint area, for example, such as those employed in a coating of nuclear reactor fuel elements. The effected molybdenum joint under such coatings as niobium carbide is the only type of graphite-to-graphite joint which actually exhibits an increase in flexural strength when heated to elevated temperatures in the order of 1900°C. or greater, whereas other refractory metal joints heated to similar temperatures in an inert atmosphere caused a significant decrease in flexural strength.

As various changes may be made in the form of the brazing material, type of brazing fixture, and arrangement of the method steps herein without departing from the spirit and scope of the invention and without sacrificing any of its advantages, it is to be understood that all matter herein is to be interpreted as illustrative and not in a limiting sense.

What is claimed is:

1. In the art of joining together structures of graphite by brazing which involves the method steps of placing selected surface portions of the graphite structures to be joined in a contiguous relationship, interposing a braze material between the contiguously disposed surface portions with the braze material contacting the surface portions, and thereafter heating the joint area of the resulting assembly to the desired brazing temperature; the improvement in the method which comprises using molybdenum powder as the braze material, applying a layer of the molybdenum powder to one or more of said surface portions, confining the joint area in an environment containing an inert atmosphere, pressing the surface portions together, heating the joint area to a temperature sufficient to melt the molybdenum and convert the latter to molybdenum carbide, subjecting the joint area to a temperature greater than about 2000°C. to effect diffusion of the molybdenum carbide into the graphite surface portions contiguous to the joint area, maintaining the joint area at the temperature greater than about 2000°C. for a duration sufficient to effect the diffusion of virtually the entire quantity of molybdenum carbide into the graphite while concurrently effecting the dissolution of excess graphite in the joint area, and thereafter cooling the joint area for effecting the precipitation of dissolved graphite into the area of the joint occupied by the molybdenum carbide prior to the diffusion thereof and thereby providing a joint consisting virtually of graphite and having properties corresponding to those of the graphite structures.

2. The improved method of joining graphite to graphite as claimed in claim 1, wherein the molybdenum powder is of a size less than about 325 mesh, and wherein the layer of molybdenum powder is of a thickness less than about 0.0005 of an inch.

3. The improved method of joining graphite to graphite as claimed in claim 2, including the additional step of coating said one or more of said surface portions with a mixture consisting of at least one of a graphite and a graphitizable material for retaining the layer of molybdenum powder thereon.

4. The improved method of joining graphite to graphite as claimed in claim 3, including the additional steps of removing excess of the mixture from said surface portion leaving only a sufficient quantity for the retention of said molybdenum powder, contacting said surface portion having the mixture thereon with a quantity of molybdenum powder, and thereafter removing excess molybdenum powder from said surface portion to provide said relatively thin layer.

5. The improved method of joining graphite to graphite as claimed in claim 3, wherein the mixture comprises partially polymerized furfuryl alcohol and graphite flour.

6. The improved method of joining graphite to graphite as claimed in claim 1, wherein the surface portions are pressed together with a force corresponding to a pressure in the range of about 1135 to 2270 pounds per square inch, and wherein the temperature sufficient to melt the molybdenum carbide is in a range of about 2500° to 2550°C.

7. The improved method of joining graphite to graphite as claimed in claim 1, wherein said temperature greater than 2000°C. is in a range of about 2000° to 2900°C., and wherein said duration for effecting the diffusion of the molybdenum carbide is in a range of about 4 hours to 0.5 hour with said duration decreasing as the temperature greater than 2000°C. increases.

8. A graphite-to-graphite joint consisting virtually entirely of graphite and provided by the improved method set forth in claim 1, said joint being characterized by possessing flexural and tensile strengths closely approximating the corresponding strengths in the graphite at low and high temperatures, a zero leak rate at elevated temperatures, and sufficient structural integrity to obviate joint failure or degradation when subjected to thermal shocks effected by rapid heating and cooling cycles.

* * * * *